United States Patent
Havard, Jr.

(10) Patent No.: US 8,920,132 B2
(45) Date of Patent: Dec. 30, 2014

(54) AUTOMATIC BLOWER CONTROL

(75) Inventor: Harold Gene Havard, Jr., Terrell, TX (US)

(73) Assignee: Lennox Industries Inc., Richardson, TX (US)

( * ) Notice: Subject to any disclaimer, the term of this patent is extended or adjusted under 35 U.S.C. 154(b) by 816 days.

(21) Appl. No.: 12/982,653

(22) Filed: Dec. 30, 2010

(65) Prior Publication Data

US 2012/0171050 A1 Jul. 5, 2012

(51) Int. Cl.
*F04D 27/00* (2006.01)
*G01F 22/02* (2006.01)

(52) U.S. Cl.
CPC .................. *F04D 27/004* (2013.01)
USPC ............... 417/44.11; 318/400.08; 417/20; 417/43

(58) Field of Classification Search
CPC ............... G01F 22/02; F04D 27/004
USPC ............ 417/44.1, 44.11, 20, 43; 318/400.08; 702/100, 45, 61
See application file for complete search history.

(56) References Cited

U.S. PATENT DOCUMENTS

| | | | |
|---|---|---|---|
| 4,499,408 A | 2/1985 | Bitting et al. | |
| 4,638,233 A * | 1/1987 | Erdman | 318/644 |
| 4,648,551 A | 3/1987 | Thompson et al. | |
| 4,777,578 A | 10/1988 | Jahns | |
| 4,777,579 A | 10/1988 | Jahns et al. | |
| 4,860,231 A | 8/1989 | Ballard et al. | |
| 5,006,744 A | 4/1991 | Archer et al. | |
| 5,447,414 A * | 9/1995 | Nordby et al. | 417/20 |
| 5,893,705 A | 4/1999 | Khan et al. | |
| 6,132,182 A | 10/2000 | Khan et al. | |
| 6,215,261 B1 | 4/2001 | Becerra | |
| 8,242,723 B2 * | 8/2012 | Green | 318/400.08 |
| 8,353,289 B2 * | 1/2013 | Farrugia et al. | 128/204.18 |
| 8,356,983 B2 * | 1/2013 | Shizuo et al. | 417/42 |
| 2004/0219875 A1 * | 11/2004 | Mills | 454/256 |
| 2006/0117769 A1 * | 6/2006 | Helt et al. | 62/161 |
| 2009/0097988 A1 * | 4/2009 | Shizuo et al. | 417/45 |
| 2010/0070205 A1 * | 3/2010 | Shahi | 702/45 |
| 2012/0037714 A1 * | 2/2012 | Tsutsumi | 236/49.3 |

FOREIGN PATENT DOCUMENTS

WO   WO 2010131336 A1 *  11/2010

* cited by examiner

*Primary Examiner* — Charles Freay
*Assistant Examiner* — Nathan Zollinger

(57) ABSTRACT

A blower system includes a blower motor and an inverter in electrical communication therewith. The blower motor is mechanically coupled to a blower configured to generate an airstream having an airflow rate. The inverter is configured to provide a motor drive signal to the motor. A flow rate calculator is configured to determine a calculated airflow rate from motor operating parameters of the blower motor using a mathematical model of the airflow rate.

13 Claims, 9 Drawing Sheets

AUTOMATIC BLOWER CONTROL

TECHNICAL FIELD

This application is directed, in general, to HVAC systems, and more specifically to control of a blower motor for use in an HVAC system.

BACKGROUND

Commissioning an HVAC (heating ventilating and air conditioning) system typically requires the services of a service technician to establish proper operation. One aspect of operation is the rate of airflow provided by the HVAC system. When the HVAC system is a variable air volume (VAV) system, the system commissioning typically includes configuring the HVAC system to produce the proper airflow at each of two or more airflow levels. This process is often laborious, and therefore expensive and time consuming.

SUMMARY

One embodiment provides a blower system that includes a blower motor mechanically coupled to a blower. The blower is configured to generate an airstream having an airflow rate. An inverter is in electrical communication with the motor. The inverter is configured to provide a motor drive signal to the motor. A flow rate calculator is configured to determine a calculated airflow rate from motor operating parameters using a mathematical model of the airflow rate.

Another embodiment provides a method of controlling a blower motor connected to a blower. The method includes providing motor operating parameters of a blower motor to a unit controller. The unit controller is configured to employ a mathematical model of airflow from the blower to determine a motor speed control signal based on the motor operating parameters. The speed control signal is provided to an inverter. A motor drive signal from the inverter is provided to the blower motor based on the speed control signal.

In another embodiment a blower unit controller is provided. The blower unit controller includes an input and an output. The input is configured to receive motor operating parameters. The output is configured to provide a motor speed control signal to an inverter. A memory is configured to store a mathematical model of airflow produced by a blower motor to relate a blower motor speed to the motor operating parameters. A processor is configured to produce the speed control signal based on the mathematical model.

Another embodiment provides a method of manufacturing an HVAC blower motor system. The method includes providing an inverter configured to produce a motor drive signal in response to a motor speed control signal. The motor drive signal is connected to a blower motor configured to generate an airflow. An airflow calculator receives motor operating parameters. The airflow calculator is configured to determine a calculated airflow using a mathematical model of the airflow as a function of the motor operating parameters.

Another embodiment provides a method of indirectly determining external static pressure in an HVAC system. The method includes providing motor operating parameters of a blower motor to an external static pressure calculator. A mathematical model of external static pressure produced by the blower motor is employed within the calculator to determine from the motor operating parameters a calculated external static pressure within an air duct coupled to a blower driven by the blower motor. The calculated external static pressure is communicated to a remote entity.

BRIEF DESCRIPTION

Reference is now made to the following descriptions taken in conjunction with the accompanying drawings, in which.

DETAILED DESCRIPTION

This disclosure benefits from the recognition by the inventor that commissioning an HVAC system that includes a blower may be advantageously simplified by employing a unit controller that includes a mathematical model of airflow rate produced by the blower. (Herein airflow rate may be referred to simply as airflow for brevity.) For example, a conventional rooftop HVAC system (rooftop unit, or RTU) typically includes a blower motor to drive a blower that circulates conditioned air in a building such as a retail store. The RTU may be a variable air volume (VAV) system, which may be configured to produce different airflow rates for different cooling or heating loads. The conventional system typically requires a trained technician to set the speed of the blower motor to a value that results in a rate of airflow desired by a customer for each desired airflow setting of the VAV. Such customization typically entails significant cost, which may be considerable when multiplied over many installed units in a large building or multiple buildings.

Advantageously, embodiments of the present disclosure provide systems and methods to obviate the need for such customization. A mathematical model is determined that describes the airflow produced by the blower as a function of various operating parameters of the blower motor. A unit controller of one or more HVAC systems may be configured with the mathematical model at a manufacturing site prior to delivery, or remotely configured after installation. The HVAC systems may then be installed without the need for flow customization by the installer. The mathematical model may be empirically determined for a particular system design and/or building configuration, and may even be customized to a particular HVAC unit if desired.

Figure 1:
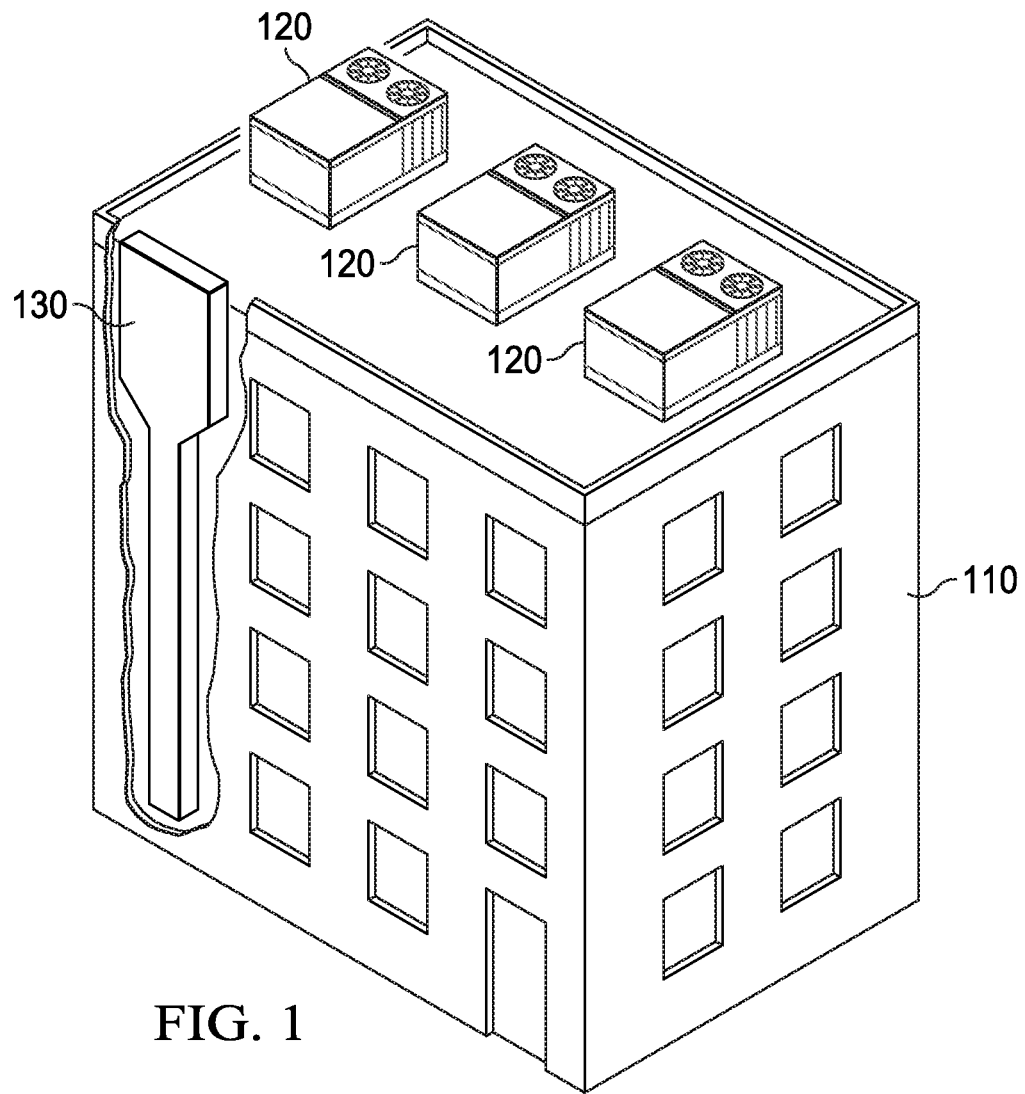
FIG. 1 illustrates a building with a number of rooftop HVAC units located thereon.

FIG. 1 illustrates a building 110 having multiple placements of a RTU 120 located thereon. The RTUs 120 may be multiple instances of a same HVAC system, but need not be. One instance of the RTUs 120 is illustratively connected to an air duct 130 to route conditioned air to desired locations within the building 110, and to route return air back to the RTU 120. The air duct 130 imposes a resistance on the flow of air within. The resistance is in part a function of the cross-sectional area and length of the duct, the velocity of the airflow, and the presence of options such as filters.

In many cases the air duct 130 may be of a standard design. For instance, a retail company may have multiple stores with a particular layout, and thus the air duct 130 may be closely similar among different store locations. Within a particular location, a standard ductwork design may be determined and placed at multiple locations within the store, thereby spreading design costs over the several placements.

Figure 2:
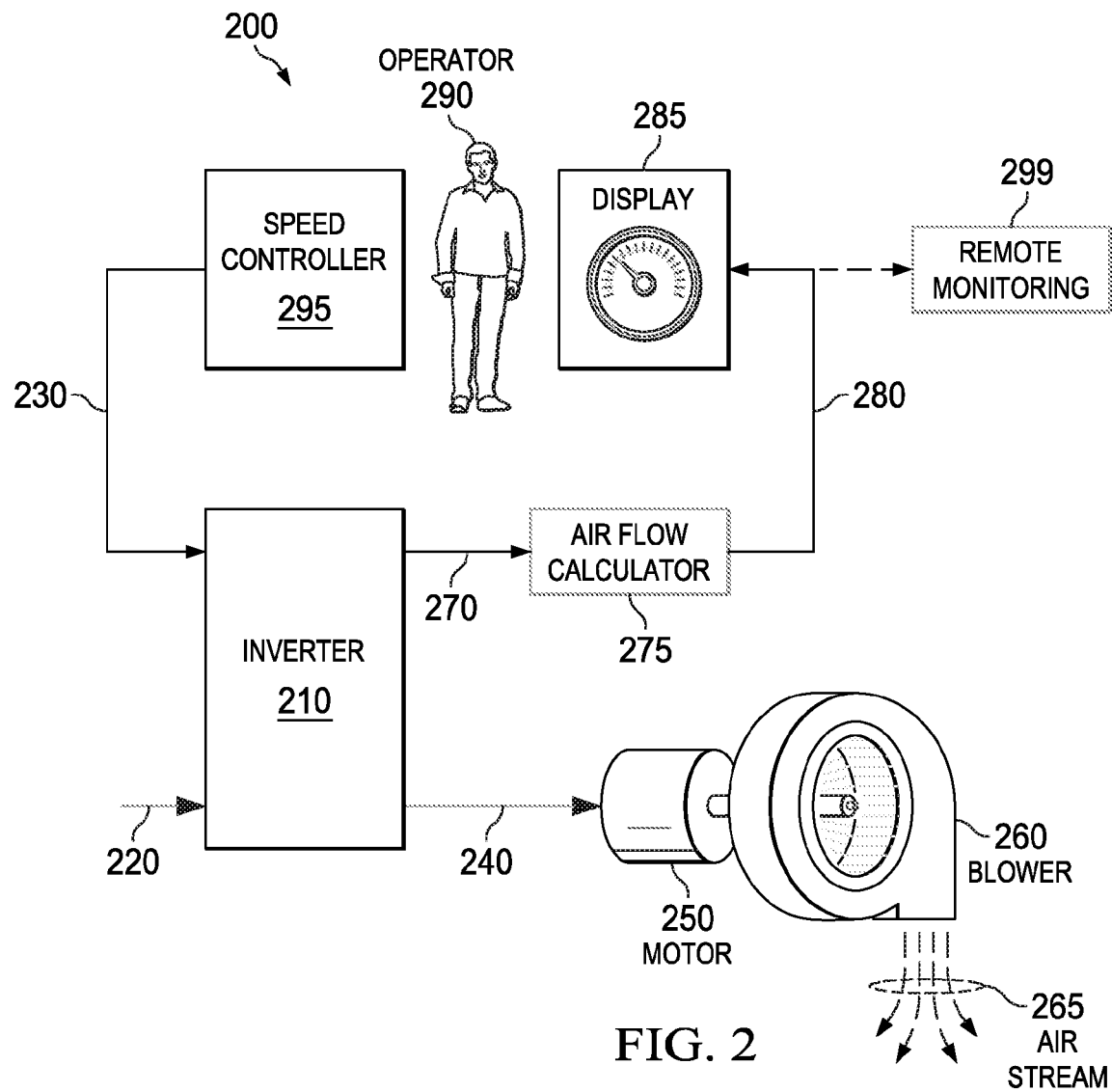
FIG. 2 illustrates a blower motor system applicable to the HVAC units of FIG. 1, including an inverter and an airflow calculator configured to calculate an airflow based on motor operating parameters received from the inverter.

FIG. 2 illustrates an embodiment of a blower system 200. The blower system 200 may be present in each instance of the RTU 120. The blower system 200 includes an inverter 210 that receives power 220 and a motor speed control signal 230. In response to the motor speed control signal 230 the inverter 210 provides a modulated motor drive signal 240 to a blower motor 250. The blower motor 250 may be, e.g. a conventional alternating current (AC) or electronically commutated motor (ECM) motor. The blower motor 250 is coupled to a blower 260 that produces an airstream 265 when turned by the blower motor 250.

Those skilled in the pertinent art are familiar with blower motors and inverters. In brief summary, the inverter 210 may produce a pulse-width modulated (PWM) signal to the blower motor 250 that has a pulse frequency and amplitude. The inverter 210 typically modulates the PWM signal by changing the amplitude, frequency and duty cycle of voltage pulses delivered to the blower motor 250, thereby controlling the speed of the blower motor 250.

Figure 12A:
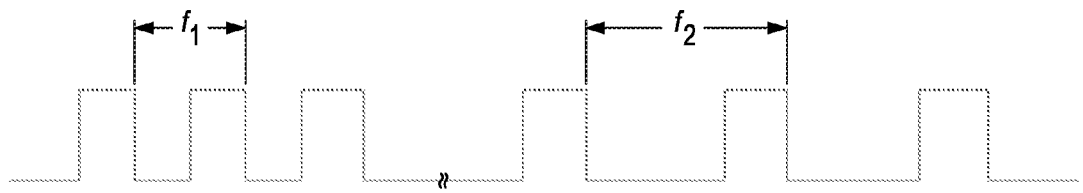
FIGS. 12A and 12B illustrate example pulse-width-modulation signals.
Figure 12B:
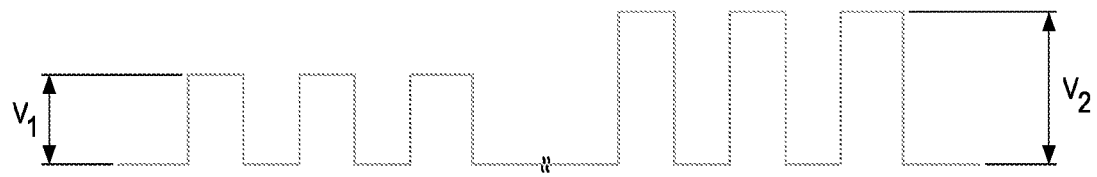

FIGS. 12A and 12B illustrate for reference characteristics of a PWM signal that may be sent from the inverter 210 the blower motor 250. In FIG. 12A, a PWM signal includes a portion with a first frequency $f_1$ and a second lower frequency $f_2$. In FIG. 12B a PWM signal includes a portion with a first voltage $V_1$ and a second greater voltage $V_2$. The power of the PWM signal may be determined from the integrated product of the voltage and current of the PWM signal.

Returning to FIG. 2, the airstream 265 has an associated airflow rate. The inverter 210 provides inverter feedback 270 to an airflow calculator 275. The inverter feedback 270 includes motor operating parameters of the blower motor 250, such as the amplitude, frequency and duty cycle of the motor drive signal 240. Those skilled in the art will appreciate that these are nonexclusive examples of the type of feedback that inverter 210 may provide.

The airflow calculator 275, described in detail below, produces a calculated airflow 280. The calculated airflow 280 may provide for closed-loop feedback to the inverter 210. In the illustrated embodiment, the calculated airflow 280 drives a display 285 that indicates the value of the airstream 265 as calculated by the airflow calculator 275 from the inverter feedback 270. An operator 290 may use the information presented on the display 285 to adjust a speed controller 295 to produce a desired airstream 265 for one or more desired airflow rates. Because the airflow is determined without direct measurement of the speed of the blower motor 250 or the airstream 265, the feedback provided via the inverter feedback 270 is referred to herein and in the claims as "indirect feedback." In some embodiments the calculated airflow 280 is communicated to a remote entity such as a remote monitoring facility 299. Such an entity may remotely collect data from numerous HVAC systems to monitor proper operation and/or efficiency of the systems. Communication may be by any means, including telephone system, the internet and/or wireless link.

The inverter 210 in principle may vary the power output of the blower motor 250 continuously from 0% to 100% of its rated power. In practice, the inverter 210 may be configured to control the speed of the blower motor 250 to one of two or more predetermined levels. For example, some VAV HVAC applications include seven predetermined levels.

Figure 3:
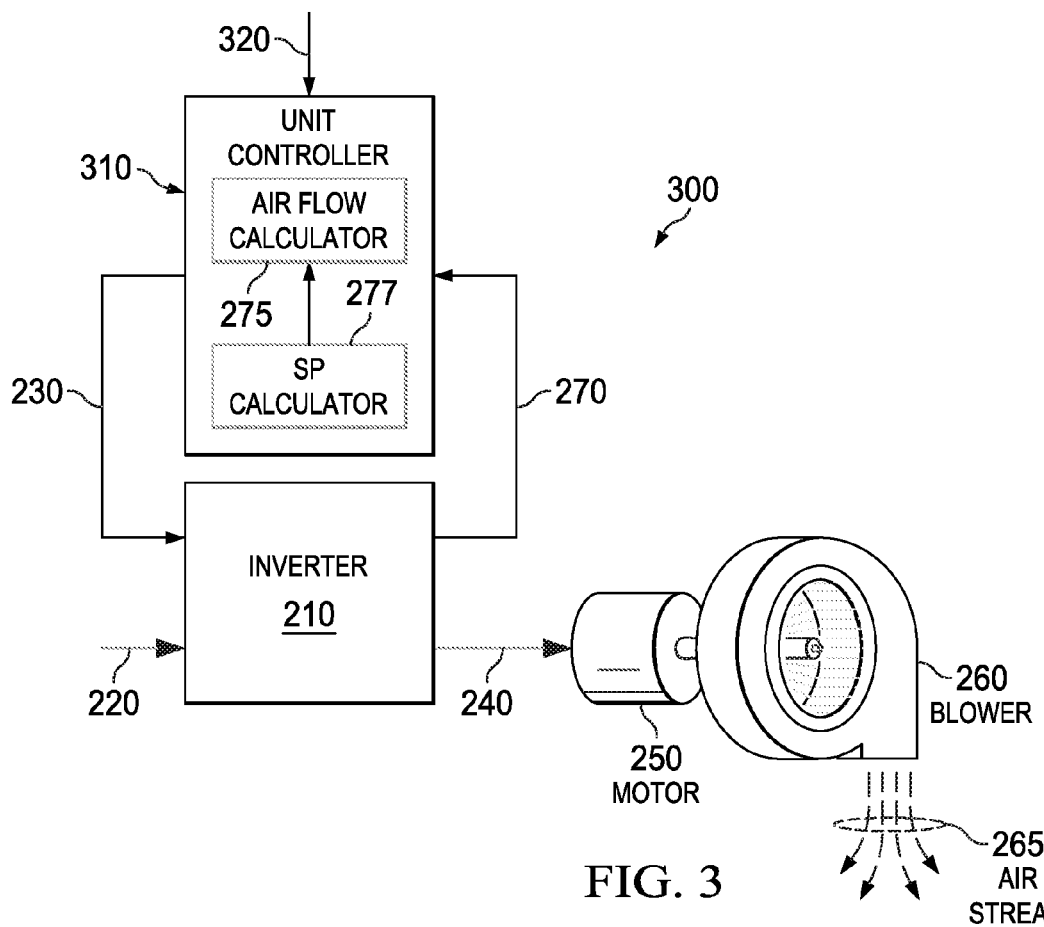
FIG. 3 illustrates a blower motor system applicable to the HVAC units of FIG. 1, including an inverter and an HVAC unit controller incorporating the airflow calculation functionality of FIG. 2.

FIG. 3 illustrates another embodiment of a blower system, generally designated 300. The blower system 300 retains many of the elements of the blower system 200, but replaces the operator 290 with a unit controller 310. In the illustrated embodiment the unit controller 310 incorporates the functionality of the airflow calculator 275. In some embodiments, as described below, the unit controller 310 includes an external static pressure calculator 277. The unit controller 310 receives the inverter feedback 270, employs the airflow calculator 275 to indirectly determine a flow rate of the airstream 265, and provides the motor speed control signal 230. The airflow calculator 275 may use a calculated external static pressure in its operation. The unit controller 310 may dynamically adjust the motor speed control signal 230 to maintain a desired airflow as indirectly determined by the airflow calculator 275.

Figure 4:
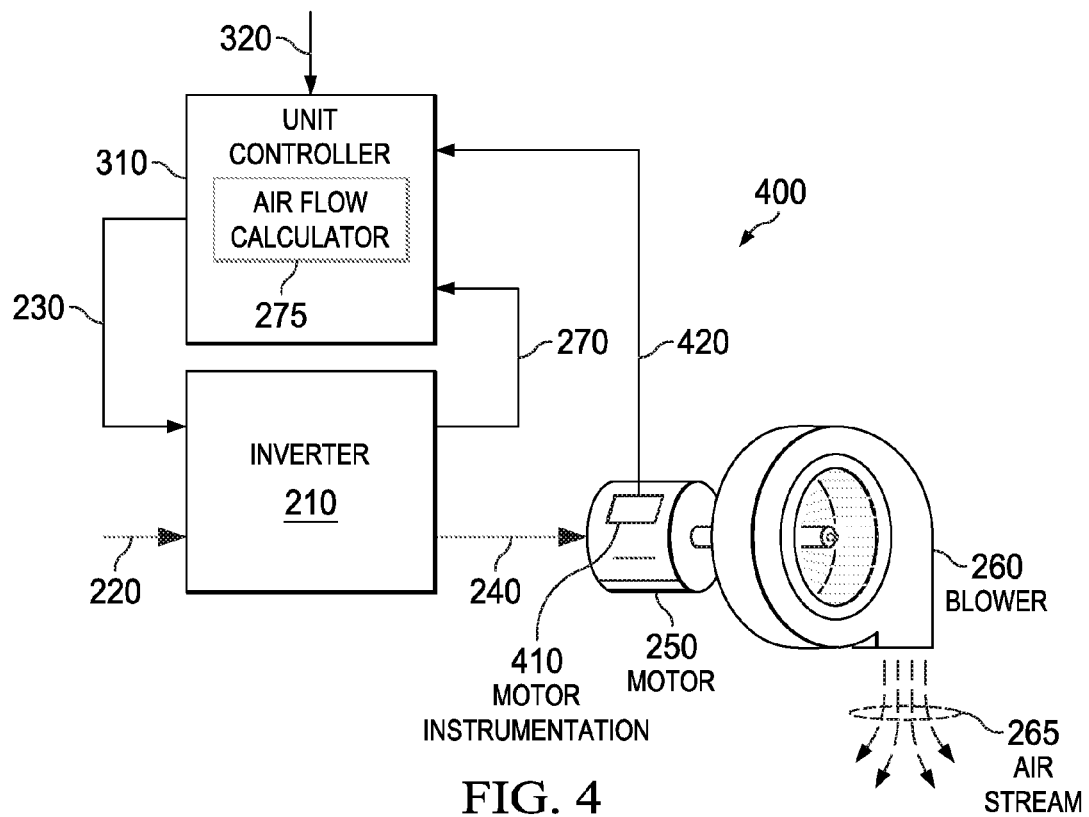
FIG. 4 illustrates an alternate embodiment of a blower motor system in which motor instrumentation provides motor operating parameters to the unit controller.

FIG. 4 illustrates another embodiment of a blower motor system generally designated 400. In this embodiment the blower motor 250 includes motor instrumentation 410 to provide motor feedback 420 to the unit controller 310. The motor feedback 420 may be in addition to or in lieu of the inverter feedback 270. Such instrumentation may include, e.g., conventional encoders, magnetic switches, optical devices, or other sensors able to determine motor operating parameters of the blower motor 250, such as the RPM, torque, frequency, voltage and/or power of operation thereof. Such instrumentation may be advantageous when the inverter 210 is not configured to provide the inverter feedback 270, or if direct measurement of the motor operation is desired to meet other system-level design objectives. In this embodiment the feedback to the unit controller 310 is directly from the blower motor 250 rather than by proxy from the inverter 210. Such feedback is referred to herein and in the claims as direct feedback.

In conventional practice, the airstream 265 for a given installation is typically calibrated for each RTU 120 for each speed setting of the blower motor 250. For example, the inverter 210 may be conventionally configured to output one of seven control levels. A mechanical connection between the blower motor 250 and the blower 260 may be adjusted to result in the airflow desired for each control level. Such adjustment may conventionally be made, e.g. by adjusting a pulley diameter in a drive train between the blower motor 250 and the blower 260.

In contrast to conventional practice, the unit controller 310 implements a mathematical model denoted G that is configured to translate the blower demand 320 to the motor speed control signal 230 to directly result in the desired airflow for each setting. The mathematical model receives as inputs, via the inverter feedback 270 or motor feedback 420, one or more variables that describe the operation of the blower motor 250.

The model then produces, as output, a calculated estimate of the airflow associated with the values of the various inputs.

Figure 5:
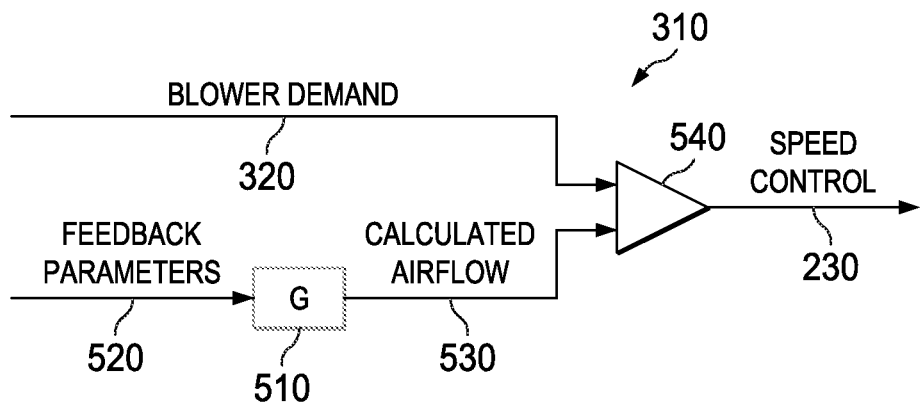
FIG. 5 illustrates a functional block diagram of the unit controller of FIG. 3.

FIG. 5 illustrates one embodiment of a functional block diagram of the unit controller 310. An airflow calculation block 510 receives feedback parameters 520 (e.g. inverter feedback 270 and/or motor feedback 420) and computes a calculated airflow 530 based on the mathematical model G. The calculation block 510 may be implemented using analog circuitry and/or digital logic. A comparator 540 receives the blower demand 320 and the calculated airflow 530, and produces the motor speed control signal 230. The motor speed control signal 230 may be conditioned as necessary to interface with the inverter 210.

By comparing the calculated airflow 530 to the blower demand 320, the unit controller 310 may indirectly monitor the actual airstream 265 and adjust the motor speed control signal 230 to result in the airstream 265 selected by the blower demand 320. Thus, a closed-loop feedback path is established that includes the unit controller 310 and the inverter 210 (and optionally the motor instrumentation 410), with the unit controller 310 using the inverter feedback 270 and/or the motor feedback 420 as a proxy for the airstream 265.

Figure 6:
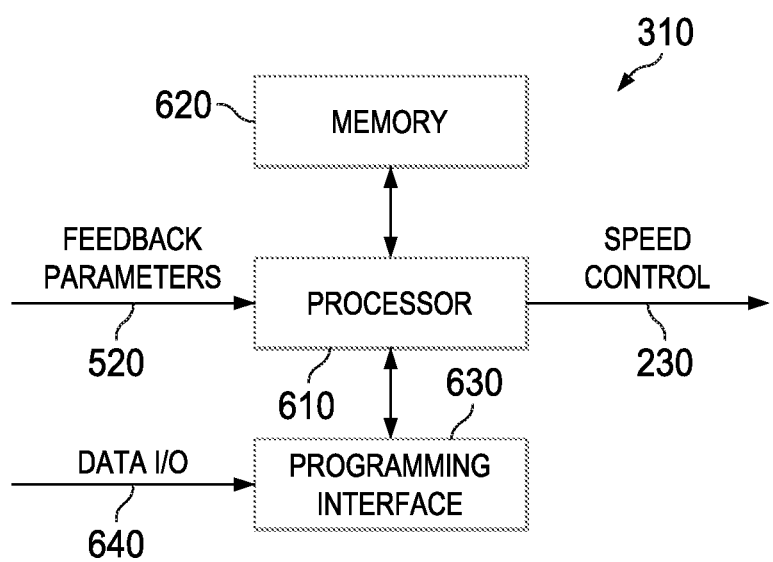
FIG. 6 illustrates an embodiment of a system configured to implement the block diagram of FIG. 4.

FIG. 6 illustrates a component block diagram of an embodiment of the unit controller 310. A processor 610 receives the feedback parameters 520. The processor 610 may be, e.g. a conventional microprocessor, microcontroller or state machine. A memory 620 stores a representation of the mathematical model G. The representation may include instructions to implement an equation, such as Equations 1 and 2 below, and may further store any coefficients needed to parameterize the equation. A programming interface 630 may provide functionality to receive configuration data from an I/O port or a network connection 640. The unit controller 310 may thereby operate to modify the mathematical model after installation of the RTU 120 if desired.

In an embodiment the mathematical model G is configured to compute the calculated airflow as a function of a frequency (f), voltage (V) and power (W) of the motor drive signal 240 as reported by the inverter 210. In various embodiments the mathematical model is a second or higher order polynomial. Coefficients of the polynomial may be determined by a regression analysis of a performance space determined from a model system assembled from components selected to closely resemble the system to be installed in the building 110.

For example the model system may be operated at various combinations of f, V and W, and the resulting flow rate determined by conventional means at each combination to determine the performance space. The combinations of f, V and W may be selected with knowledge of the expected operating conditions of, e.g. the blower system 200, thereby increasing the quality of the regression fit obtained from the data in the operating regime of interest. For example, the tested performance space may be restricted to combinations of f, V and W that produce airflow in a desired range.

In another example, the mathematical model may be determined from fitting multiple airflow ranges centered about an air flow of interest, e.g. 7000 m³/hr, 14000 m³/hr and 25000 m³/hr. In some cases, a fractional experimental design may be used to reduce the number of test conditions. Those skilled in statistics and experimental design are knowledgeable of such methods.

The principles described above are further developed by non-limiting examples provided below. Those skilled in the pertinent art will appreciate that these examples are not exclusive of other embodiments within the scope of the disclosure.

Example 1

In a first example, a model system was assembled using a 20 ton (~70 kW) HVAC unit. A test duct was connected to the unit to approximate the ducting used for a commercial retail building with a 20 foot (~6 m) ceiling height. Airflow was determined in the test duct at the outlet of the HVAC unit blower for each combination of f, V and W tested. The airflow range was restricted to between about 6000 m³/hr (~3500 CFM) and about 18,700 m³/hr (~11,000 CFM). The airflow measurement at each condition was repeated between 2 and 7 times depending on reproducibility at each condition. A total of 61 airflow measurements were obtained.

Analysis of the airflow dataset was performed using Minitab 16 Statistical Software, available from Minitab, Inc., State College, Pa. Least-squares regression was performed using f, V and W as variables to fit a mathematical model having the form of Eq. 1, below. Thus, seven coefficients $C_0 \ldots C_6$ were determined. Table I below includes the calculated coefficients with associated standard error and P values.

$$G(m^3/hr) = C_0 + C_1*f + C_2*V + C_3*W + C_4*f^2 + C_5*V^2 + C_6*W^2 \quad \text{Eq. 1}$$

where f is frequency in $s^{-1}$,
V is voltage in volts, and
W is power in kW.

TABLE I

| Predictor | Coefficient | Coefficient Value | Standard Error | P |
|---|---|---|---|---|
| Constant | $C_0$ | −298.34 | 793.4 | 0.708 |
| Inverter Frequency, f | $C_1$ | −6037.06 | 1430.6 | 0.000 |
| Inverter Volts, V | $C_2$ | 818.41 | 187.4 | 0.000 |
| Inverter Power, W (in kW) | $C_3$ | 5626.4 | 297.3 | 0.000 |
| $f^2$ | $C_4$ | 57.678 | 13.91 | 0.000 |
| $V^2$ | $C_5$ | −1.0865 | 0.2351 | 0.000 |
| $W^2$ | $C_6$ | −277.51 | 33.21 | 0.000 |

Figure 7:
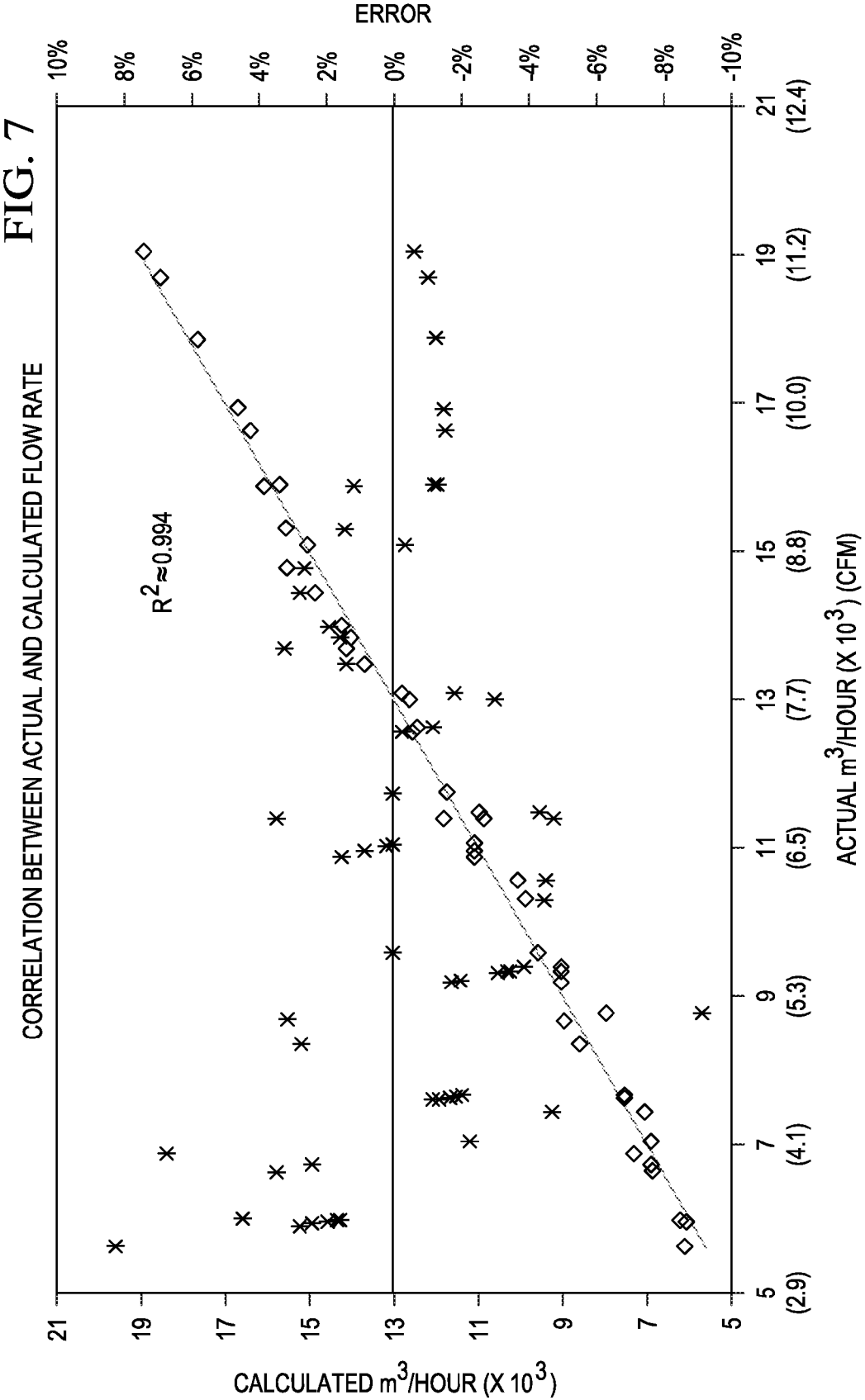
FIGS. 7 and 8 are correlation plots for two examples of measured and calculated airflow of a test HVAC system, where the airflow is calculated according to embodiments of the disclosure.

The parameterized mathematical model represented by Eq. 1 was used to calculate the blower output for each measurement condition, e.g. each combination of f, V and W. FIG. 7 illustrates the correlation between the measured values of airflow (horizontal axis) and the calculated values of airflow (left hand vertical axis). A calculated error value (right hand vertical axis) was determined as the difference between calculated airflow and actual airflow, normalized by the actual airflow. The error values overlie the correlation data.

The coefficient of determination $R^2$ of the regression is about 0.994, indicating a high quality fit between the measured and the calculated flow rates. Below about 9000 m³/hr, the computed error is about 9% or less. Above about 9000 m³/hr the computed error is about 5% or less.

Example 2

In a second example, the dataset obtained in the previous example was reanalyzed adding an external static pressure (SP) term to the mathematical model G, with the modified model being designated G' in Eq. 3 below. The pressure within the test duct was measured at the inlet to the blower and at the outlet from the blower for each test condition at which the airflow was measured. The external static pressure was determined as the sum of the measured inlet and outlet pressures.

A polynomial having the form of Eq. 2 below was fit to the measured external static pressure. A calculated external static pressure was then determined using Eq. 2 for each test condition to augment the measured airflow data. Eq. 3 represents a refined airflow model that includes refined coefficients $C_0' \ldots C_6'$ and an eighth coefficient $C_7'$ corresponding to the external static pressure term. Eq. 3 was fit to the augmented test data set using Minitab, resulting in the refined coefficient values shown in Table II.

$$SP(Pa) = K_0 + K_1*f + K_2*V + K_3*W + K_4*f^2 + K_5*V^2 + K_6*W^2 \qquad \text{Eq. 2}$$

$$G'(m^3/hr) = C_0' + C_1'*f + C_2'*V + C_3'*W + C_4'*f^2 + C_5'*V^2 + C_6'*W^2 + C_7'SP \qquad \text{Eq. 3}$$

TABLE II

| Predictor | Coefficient | Coefficient Value | Standard Error | P |
|---|---|---|---|---|
| Constant | $C_0'$ | 336.9 | 667.4 | 0.616 |
| Inverter Frequency, f | $C_1'$ | −5309 | 113.7 | 0.000 |
| Inverter Volts, V | $C_2'$ | 717.9 | 145.8 | 0.000 |
| Inverter Power, W (in kW) | $C_3'$ | 3655 | 487.6 | 0.000 |
| $f^2$ | $C_4'$ | 54.63 | 10.86 | 0.000 |
| $V^2$ | $C_5'$ | −0.9562 | 0.1832 | 0.000 |
| $f^2$ | $C_6'$ | −203.0 | 29.34 | 0.000 |
| Static Pressure (SP) | $C_7'$ | −4345 | 1045 | 0.000 |

Figure 8:
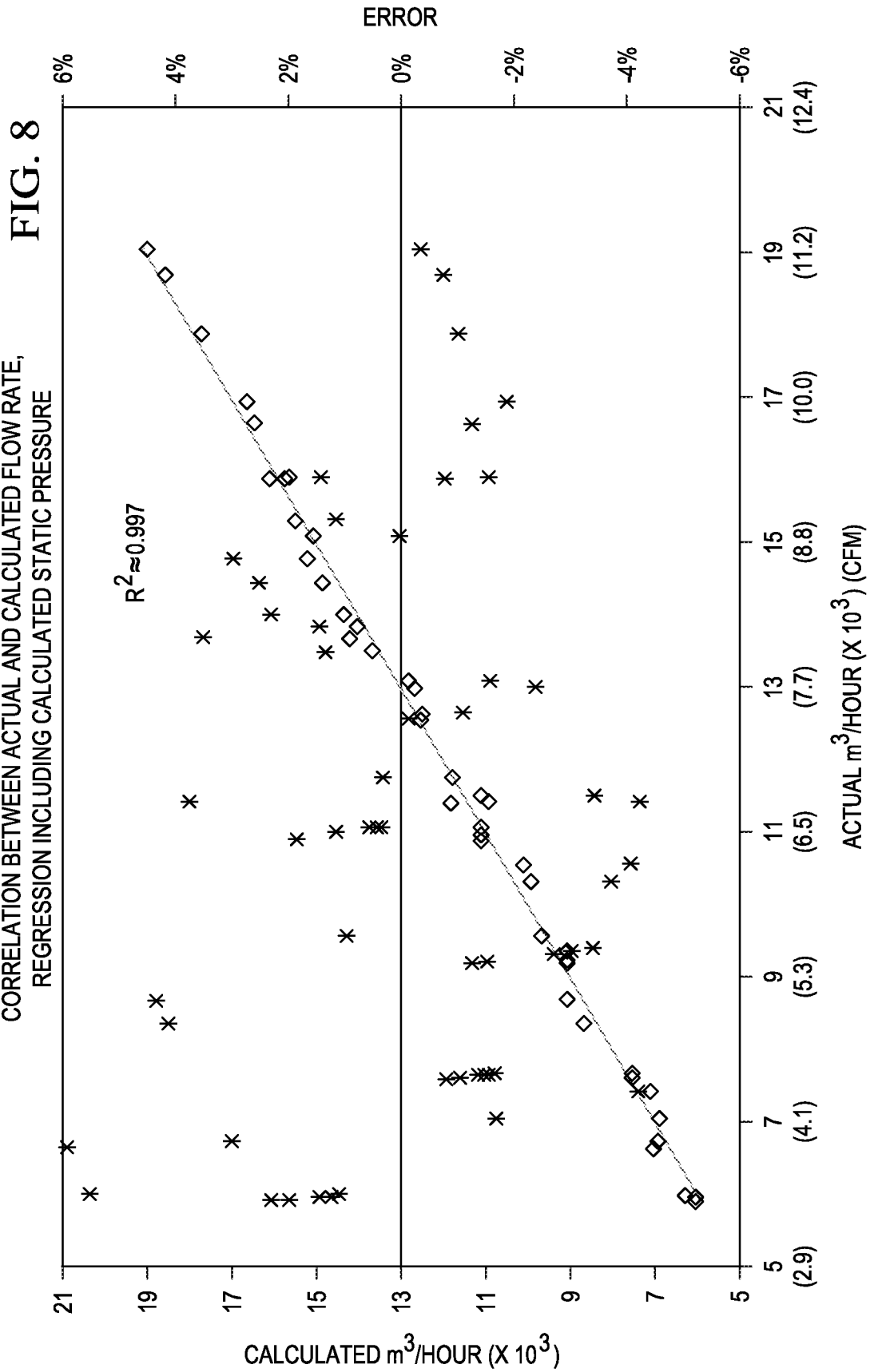

The parameterized mathematical model represented by Eq. 3 was again used to calculate the blower output for each measurement condition. FIG. 8 illustrates the correlation between the measured values of airflow and the calculated values of airflow, with overlying calculated error values as described previously.

Above about 9000 m$^3$/hr the computed error is improved to about 4% or less. However, a greater improvement of the calculated error occurs for airflow values less than about 9000 m$^3$/hr, for which the error does not exceed about 6%. The coefficient of determination, $R^2$, of the regression is about 0.997, indicating an improved fit of the mathematical model relative to the first example.

As these examples demonstrate, the mathematical models G, G' may be parameterized to determine from motor operating parameters the airflow produced by the blower motor 250. Furthermore, the mathematical models G, G' may be used to provide an instantaneous or continuously adjustable correction of the motor speed control signal 230. Thus, the feedback loop between the unit controller 310 and the inverter 210, either by direct or indirect feedback, may provide accurate control of the airstream 265 in any HVAC system that is closely similar to the system used to empirically determine the mathematical models G, G'. The manual adjustment of airflow typically required in conventional HVAC systems is thereby rendered unnecessary, resulting in substantial cost savings and speeding commissioning of new systems.

Variations of the parameterization procedures exemplified above are possible and contemplated. In one example, the highest power of the model polynomial may be increased. In another example, the external static pressure term of Eq. 2 may be replaced by a parameterized polynomial fit to the measured external static pressure, e.g. Eq. 2. In some cases this may result in a greater correlation coefficient, and lower computed error of various airflow values. Those skilled in the pertinent art will appreciate that other variations of the methodology described herein are within the scope of the disclosure. In yet another example, the single polynomial fit of, e.g., Eq. 1 may be replaced by a piecewise-linear fit, with ranges of individual linear portions of the model being selected to further increase $R^2$ and/or reduce the calculated error values.

The external static pressure model SP represented by Eq. 2 may also be employed to replace direct measurement of external the static pressure. Typically, external static pressure in a deployed HVAC system is determined by inserting pressure monitors into the air duct before and after the blower. Such measurement is typically time-intensive and typically requires the presence of a service technician. Such measurements may be needed periodically to, e.g. determine a degree of blockage of the air ducts of the system. The SP model may render unnecessary the manual measurement provided by the service technician. The presence of an obstruction in the air duct may thus be determined indirectly using the SP model.

Figure 13:
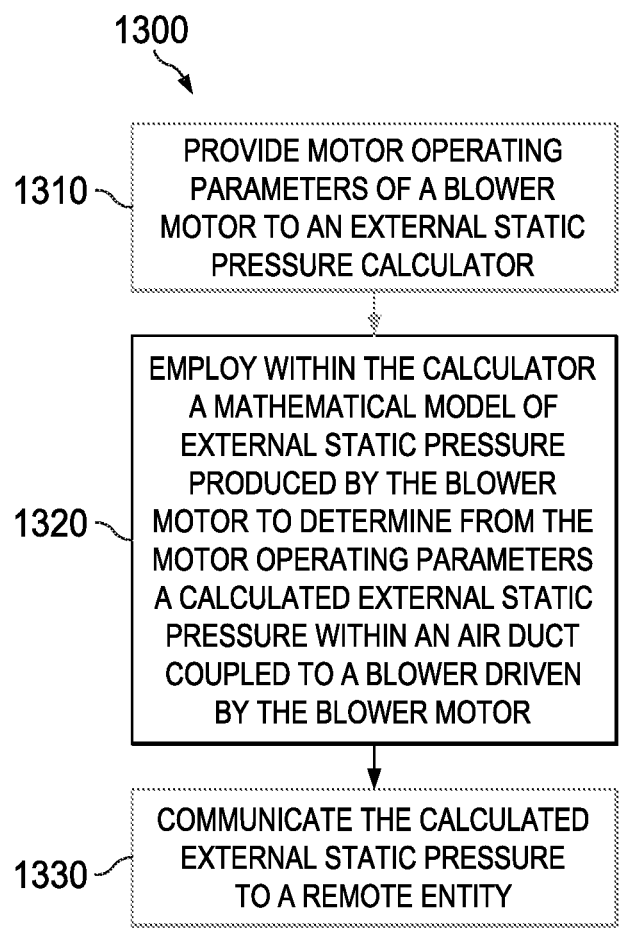
FIG. 13 illustrates a method of indirectly determining an external static pressure in an HVAC system.

FIG. 13 illustrates a method 1300 of indirectly determining an external static pressure in an HVAC system. The method 1300 is described without limitation by reference to the systems 200, 300 of FIGS. 2 and 3. In a first step 1310 motor operating parameters of a blower motor, such as the blower motor 250, are communicated to an external static pressure calculator such as the calculator 277. In a second step 1320 a mathematical model of external static pressure produced by the blower motor 250 is employed within the calculator 277. The calculator 277 determines from the motor operating parameters a calculated external static pressure within an air duct coupled to a blower driven by the blower motor 250, e.g. the blower 260. In a third step 1330 the calculated external static pressure is communicated by the external static pressure calculator 277 to a remote entity such as the remote monitoring facility 299. A remote entity may be, e.g. a display such as the display 285, the remote facility 299, or an electronic system external to the calculator 277. Remote communication may include electronically communicating the calculated external static pressure to one or more of an alarm, a system controller, and a communication network such as the Internet.

In some embodiments a system controller, such as the unit controller 310, is configured to modify operation of the system 300 in response to an excessive calculated external static pressure. Modification of operation may include, e.g. limiting the blower motor 250 speed or disabling operation of the system 300. In some embodiments communication over a network includes alerting a central control center of an excessive external static pressure.

Figure 9:
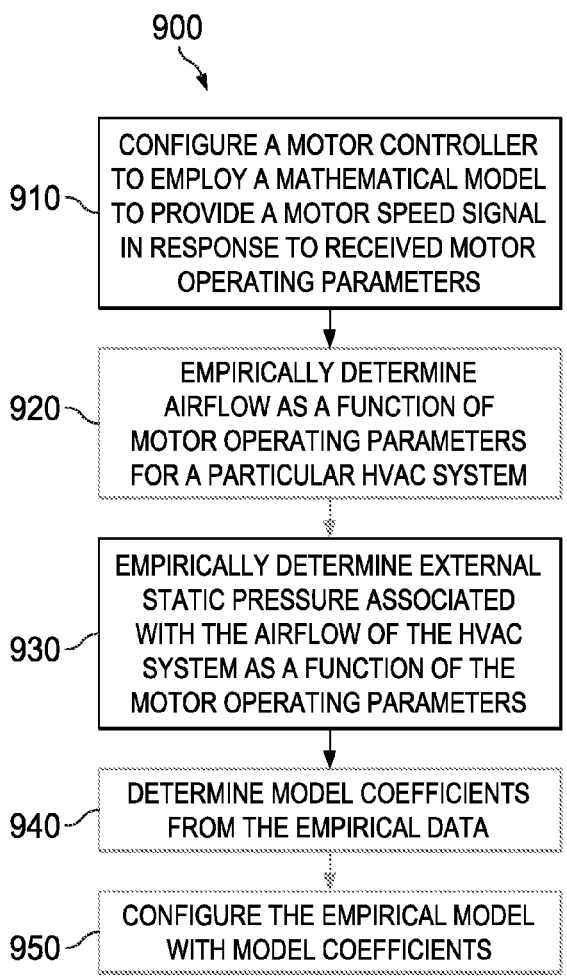
FIG. 9 is a method of configuring an HVAC unit controller with a mathematical airflow model.
Figure 10:
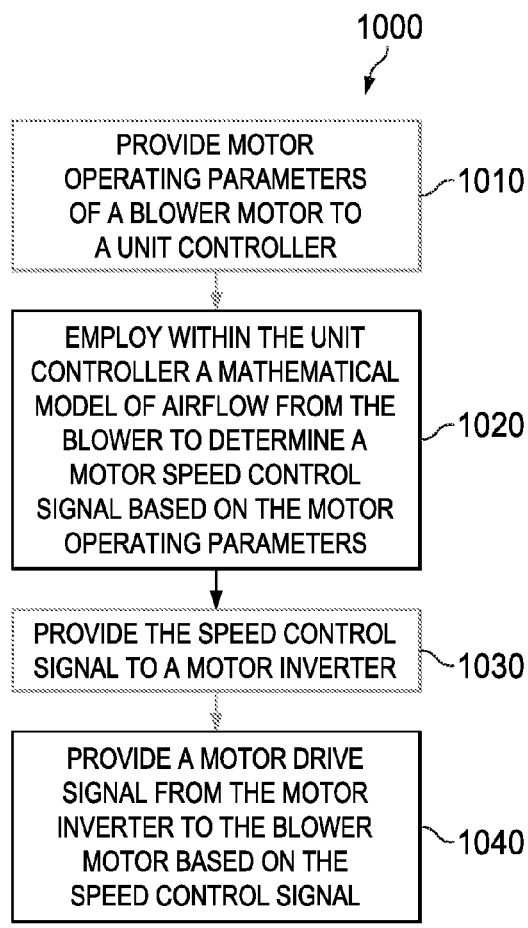
FIG. 10 is a method of controlling a blower motor.
Figure 11:
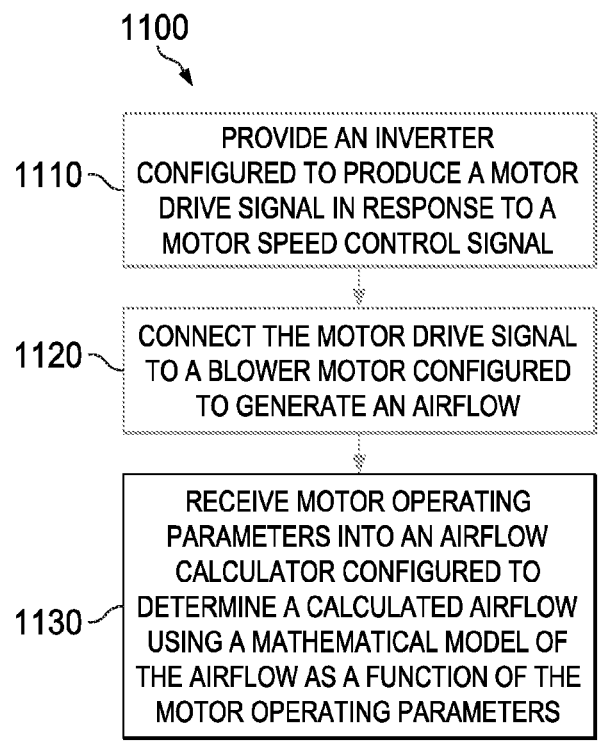
FIG. 11 is a method of manufacturing an HVAC blower motor system.

Turning now to FIGS. 9-11, various methods of the disclosure are presented. These methods are described without limitation with reference to the elements of the blower systems 200, 300, 400. The steps of the methods may be performed in an order other than those illustrated.

FIG. 9 illustrates a method 900 of configuring a unit controller with an empirical airflow model. In a step 910, a unit controller is configured to employ a mathematical model to provide a motor speed signal in response to received motor operating parameters. As described previously, the model may be a mathematical representation of airflow from the blower motor 250 as a function of one or more parameters that describe the performance of the blower motor 250. The model includes coefficients that determine the weight of various first and higher order terms of the model.

In a step 920, airflow produced by the blower motor 250 is empirically determined as a function of motor operating parameters for a particular HVAC system. The determining may include experimental measurement of airflow in a test system representative of an HVAC system to be installed in multiple instances.

In a step 930, the external static pressure associated with the airflow in the test system may optionally be empirically determined as a function of the motor operating parameters. Optionally the external static pressure may be expressed in terms of another mathematical model as a function of motor operating parameters.

In a step 940, the coefficients of the model are determined from the empirical data. When the static pressure is determined, a coefficient weighting the contribution of the static pressure to the calculated airflow is also determined.

In a step 950, the model is configured to include the calculated coefficients. Configuring may include, e.g. storing the coefficients in the memory 620.

FIG. 10 illustrates a method 1000 of controlling a blower motor. In a step 1010 motor operating parameters of the blower motor 250 are provided to the unit controller 310. In a step 1020 a mathematical model within the unit controller 310 is used to determine the motor speed control signal 230 based on the motor operating parameters. In a step 1030 the motor speed control signal 230 is provided to the inverter 210. In a step 1040 the motor drive signal 240 from the inverter 210 is provided to the blower motor based on the speed control signal. Optionally the motor operating parameters are provided by the inverter 210. Optionally the motor operating parameters are provided by instrumentation coupled directly to the blower motor 250.

FIG. 11 illustrates a method 1100 of manufacturing an HVAC blower motor system, such as the blower systems 200, 300, 400. In a step 1110 the inverter 210 is provided. Herein and in the claims, "provided" in the present context means that the unit controller 310 may be manufactured by the individual or business entity performing the method, or obtained thereby from a source other than the individual or entity, including another individual or business entity. The inverter 210 is configured to produce a motor drive signal in response to a motor speed control signal. In a step 1120 the motor drive signal is connected to a blower motor configured to generate an airflow. In a step 1130 motor operating parameters are received into an airflow calculator. The airflow calculator is configured to determine a calculated airflow using a mathematical model of the airflow as a function of the motor operating parameters.

Those skilled in the art to which this application relates will appreciate that other and further additions, deletions, substitutions and modifications may be made to the described embodiments.

What is claimed is:

1. A blower system, comprising:
a blower motor mechanically coupled to a blower configured to generate an airstream having an airflow rate;
an inverter in electrical communication with said motor and configured to provide a motor drive signal to said motor; and
a flow rate calculator configured to determine a calculated airflow rate from motor operating parameters of said blower motor using a mathematical model of said airflow rate, wherein said mathematical model is configured to calculate the airflow rate as a function of at least frequency, voltage, and power of said inverter, and said mathematical model includes a term that includes a static pressure of said airstream.

2. The blower system as recited in claim 1, further comprising a unit controller configured to receive said operating parameters and to provide a speed control signal to said inverter based on said calculated flow rate.

3. The blower system as recited in claim 1, wherein said inverter provides said motor operating parameters.

4. The blower system as recited in claim 1, wherein said blower system is a component of a commercial HVAC system.

5. A method of controlling a blower motor connected to a blower, comprising:
providing motor operating parameters of said blower motor to a unit controller;
employing within said unit controller a mathematical model of airflow from said blower to determine a motor speed control signal based on said motor operating parameters;
providing said speed control signal to an inverter; and
providing a motor drive signal from said inverter to said blower motor based on said speed control signal;
wherein said mathematical model is configured to calculate the airflow rate as a function of at least frequency, voltage, and power of said inverter, and said mathematical model includes a term that includes a static pressure of said airstream.

6. The method as recited in claim 5, further comprising providing said motor operating parameters from motor instrumentation.

7. The method as recited in claim 5, wherein said motor operating parameters include frequency, voltage and power of said motor drive signal.

8. The method as recited in claim 5, wherein said mathematical model includes linear and quadratic terms for each of said motor operating parameters.

9. A method of manufacturing an HVAC blower motor system, comprising:
providing an inverter configured to produce a motor drive signal in response to a motor speed control signal;
connecting said motor drive signal to a blower motor configured to generate an airflow; and
receiving motor operating parameters into an airflow calculator configured to determine a calculated airflow using a mathematical model of said airflow as a function of said motor operating parameters wherein said motor operating parameters include frequency, voltage and power of a motor drive signal, wherein said mathematical model includes an external static pressure term determined from said airflow.

10. The method as recited in claim 9, further comprising providing a unit controller configured to output said motor speed control signal to said inverter, wherein said unit controller includes said airflow calculator, and said motor speed control signal is determined from said calculated airflow.

11. The method as recited in claim 9, wherein said inverter provides said motor operating parameters to said airflow calculator.

12. The method as recited in claim 9, wherein said blower motor is a component of a commercial HVAC system.

13. A method of indirectly determining external static pressure in an HVAC system, comprising:
providing motor operating parameters of a blower motor to an external static pressure calculator;
employing within said calculator a mathematical model of external static pressure produced by said blower motor to determine from said motor operating parameters a calculated external static pressure within an air duct coupled to a blower driven by said blower motor, wherein said motor operating parameters include frequency, voltage and power of a motor drive signal;

calculating a coefficient weighting contribution of said static pressure; and communicating said calculated external static pressure and calculated coefficient to a remote entity.

* * * * *